Patented Jan. 17, 1928.

1,656,804

UNITED STATES PATENT OFFICE.

KARL HEINRICH WOLMAN, OF BERLIN-GRUNEWALD, GERMANY.

WOOD-PRESERVING COMPOSITION.

No Drawing. Application filed August 9, 1924, Serial No. 731,223, and in Austria May 23, 1924.

The object of the preservation of wood is, as is known, to protect the wood against destroying influences, especially as regards the wood-destroying fungi and animals. There exists quite a number of both these latter, the presence of which is a constant danger for the wood, the degree of dangerousness being different according to the local, climatic and other conditions under which the wood is used. Investigations carried through in a number of years have disclosed the fact that the resistibility of the various wood-destroying fungi with respect to the various wood-preserving means is very different, so that the composition of a wood-preserving means which shall be effective under all circumstances must be such that the development of all wood-destroying organism, first of all of the fungi and of the noxious animals, is securely prevented.

The present invention relates to a wood-preserving means of such a composition; it is effective not only against one or another wood-enemy, but against all. The wood-preserving composition comprises fluorine-compounds, as for instance water-soluble salts of hydrofluoric acid or of hydro-fluo-silicic acid or combinations of both, furthermore nitrated phenols, or products of the nitration of the homologue phenols, or of the salts or the derivates thereof, as for instance mononitro phenols, dinitro-phenols, dinitro-phenol-salts; or nitrated cresols or the salts or the derivates or mixtures thereof; furthermore soluble arsen-compounds, as for instance arsenic acid, arsenious acid, of salts of these acids, or combinations of several arsenic compounds.

To these components may be added such compounds which prevent the iron from being affected by the solution of the impregnating means, as for instance sodium arsenate, borax, or alkali metal bichromates, or which diminish the inflammability of the wood, as for instance, sulphate or borate of ammonium, sodium chloride, sulphate of sodium, or the mixture thereof, and so on.

*First example.*

13 parts of arsenious acid, 20 parts of sodium-arsenate, 20 parts of sodium-fluoride, 20 parts of sodium silico-fluoride and 10 parts of 2,4 dinitrophenol are dissolved in water, and this solution is then used for the impregnation of the woods.

*Second example.*

80 parts of sodium-fluoride, 10 parts of sodium-arsenate, 5 parts of dinitro-cresol, 4 parts of ortho-nitrophenol, 18 parts of phosphate of ammonium, and 30 parts of sodium-chloride are dissolved in 8000 parts of water. Also this solution is then used for the impregnation of wood.

The solutions may be employed in any desired manner, that means either in cold or in hot state, in open vats or in closed vessels, in a vacuum or under pressure, or after Boucherie's method. The components may be mixed first and then dissolved, or each may be dissolved separately and these solutions may then be mixed with each other, or first the first of the components may be dissolved in a quantity of water sufficient for all components, then the second component is introduced into this solution, thereafter the third is introduced into the solution now obtained, and so on, until all components have been dissolved successively.

I claim:

A wood preserving composition, comprising arsenic acid, sodium arsenate, sodium fluoride, sodium silico-fluoride and dinitrophenol.

In testimony whereof I affix my signature.

KARL HEINRICH WOLMAN.